United States Patent [19]
Tribbett et al.

[11] 3,947,196
[45] Mar. 30, 1976

[54] INJECTION MOLDING APPARATUS

[75] Inventors: Murray C. Tribbett; George H. Laug, both of Piqua, Ohio

[73] Assignee: The French Oil Mill Machinery Company, Piqua, Ohio

[22] Filed: Mar. 28, 1974

[21] Appl. No.: 455,621

[52] U.S. Cl. ........ 425/248; 425/DIG. 221; 425/246; 425/451.9
[51] Int. Cl.[2] .......................................... B29F 1/06
[58] Field of Search....... 425/250, 242 R, DIG. 223, 425/DIG. 221, 246, 450 R, 441, 442, DIG. 201, 248, DIG. 222, 250, 451.9, 451.2; 164/323, 137

[56] References Cited
UNITED STATES PATENTS

| | | | |
|---|---|---|---|
| 2,689.978 | 9/1954 | Roger | 425/450 |
| 2,718,662 | 9/1955 | Bohannon et al. | 425/DIG. 221 |
| 2,916,768 | 12/1959 | Quere et al. | 425/DIG. 223 |
| 2,972,776 | 2/1961 | Siegrist | 425/246 X |
| 3,120,039 | 2/1964 | Stubbe et al. | 425/DIG. 223 X |
| 3,121,918 | 2/1964 | Jurgeleit | 425/250 X |
| 3,425,095 | 2/1969 | Kotek | 425/441 X |
| 3,464,091 | 9/1969 | Bielfeldt | 425/DIG. 201 |
| 3,465,387 | 9/1969 | Allard et al. | 425/DIG. 223 |
| 3,497,919 | 3/1970 | Brochetti | 425/DIG. 223 |

FOREIGN PATENTS OR APPLICATIONS

| | | | |
|---|---|---|---|
| 419,587 | 3/1967 | Switzerland | 425/242 |
| 1,380,689 | 10/1964 | France | 425/246 |
| 1,325,799 | 3/1963 | France | 425/246 |

*Primary Examiner*—R. J. Shore
*Assistant Examiner*—David S. Safran
*Attorney, Agent, or Firm*—Jacox & Meckstroth

[57] ABSTRACT

A rubber material is sequentially injected into a plurality of elongated molds positioned within a corresponding plurality of vertical hydraulic presses arranged in a row. The material is injected into each mold by a pair of injection molding machines which are arranged in side-by-side relation and are supported by a carriage for both axial and lateral movement as a unit. Each of the molds has a set of mold sections which are supported by upper and lower platens of the corresponding press, and each press includes a set of vertical tie rods which are spaced longitudinally along the mold and are actuated by hydraulic cylinders for rigidly clamping the platens and mold sections together. The tie rods have upper end portions which are releasably locked to the upper mold platen by a laterally movable latch mechanism. After a molding cycle, the latch mechanism is released, and the tie rods are retracted downwardly. The mold is then opened, and the upper and lower mold sections within each press are automatically moved or shifted laterally through the paths of the tie rods by a mold transfer mechanism. The transfer mechanism also positions the upper mold section so that it slopes upwardly and the lower mold section slopes downwardly to provide for conveniently removing the molded parts. The mold sections are then automatically returned to the press and closed, and the tie rods are extended and latched for the next molding cycle.

23 Claims, 12 Drawing Figures

INJECTION MOLDING APPARATUS

BACKGROUND OF THE INVENTION

In the molding of an elongated rubber article or part having substantial length, it is sometimes desirable to provide for removing the mold from the press after each molding operation to provide for more convenient removal of the molded rubber part or parts from the mold. Preferably, when the mold has substantial length, it is desirable to move the mold laterally outwardly from between the mold support platens of the press in order to minimize the distance and time for moving the mold into and out of the press.

It has also been found that the molding of an elongated part having substantial length, usually requires that the mold sections and the mold support platens of the hydraulic press be constructed with substantial mass and rigidity so that when the mold support platens are pressed together, the mold sections are also pressed together with generally uniform pressure along the length of the mold sections. This distribution of the clamping force is desirable to avoid any separtion of the mold sections by the substantial pressure developed in the mold cavity or cavities when the rubber material is forced into the mold from the injection molding machine. The substantial mass of the mold sections and of the mold support platens significantly increase the weight, size and cost of the mold and of the hydraulic molding press.

SUMMARY OF THE PRESENT INVENTION

The present invention is directed to improved injection molding apparatus which is ideally suited for efficiently molding rubber articles or parts of substantial length and which provides for minimizing the size and mass of both the press and mold. The apparatus of the invention includes an improved hydraulic press which assures that the elongated mold sections are held together with a substantial force distributed uniformly along the length of the mold. In addition, the apparatus provides for quickly removing the mold sections laterally from the press after the mold sections are opened and for positioning the mold sections where the press operator may quickly and conveniently remove the molded rubber part or parts from the mold sections. As a result, the apparatus of the invention provides for significantly increasing the rate of producing or molding a high volume of large rubber parts by significantly reducing the time of the molding cycle.

In accordance with preferred embodiments of the invention, the above features and advantages are provided in apparatus which includes a series of vertical hydraulic presses arranged in a row. Each press includes a set of upper and lower platens which support corresponding sections of an elongated mold. Each mold has laterally spaced cavities which receive rubber material from a pair of injection molding machines positioned in side-by-side relation. The machines are supported for both axial and lateral movement as a unit by a carriage mounted on a set of tracks extending parallel to the row of hydraulic presses.

Each of the hydraulic presses includes a set of vertical tie rods which are spaced longitudinally along the length of the corresponding mold, and the upper end portions of the tie rods are releasably secured to the upper platen of the press by a laterally moving latch plate. The tie rods are supported for axial movement by the lower platen of the press and are retractable downwardly as a unit in response to actuation of a set of longitudinally spaced hydraulic cylinders depending from the lower platen of the press and connected to a common actuator plate for the tie rods. After the tie rods are retracted and the press is opened, the mold sections are automatically removed laterally from the press by a mold transfer mechanism which tilts the lower mold section downwardly and tilts the upper mold section upwardly to expose the inner surfaces of the mold sections for conveniently removing the molded rubber parts.

Other features and advantages of the invention will be apparent from the following description, the accompanying drawings and the appended claims.

BRIEF DESCRIPTION OF THE DRAWINGS

FIG. 7 is a lateral section of the elongated mold shown in FIG. 1;

DESCRIPTION OF THE PREFERRED EMBODIMENTS

Figure 1:
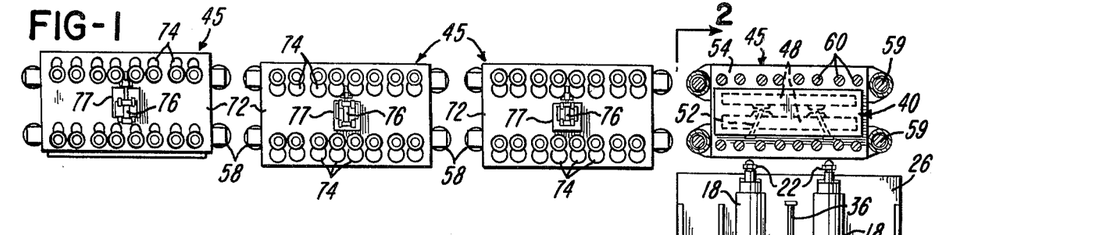
FIG. 1 is a plan view of injection molding apparatus constructed in accordance with the invention and with the upper portion of one of the molding presses broken away to show the position of an elongated mold.

Referring to FIG. 1, a pair of rubber injection molding machines 15 are mounted on a platform 16 in side-by-side parallel relation, and each machine 15 includes an elongated cylindrical barrel 18 which encloses an injection screw (not shown) driven by a motor 20. The barrel 18 of each machine 15 supports an injection nozzle 22 through which is ejected a heated compound of elastomeric rubber material supplied to the machine 15. It is to be understood, however, that the specific construction of each of the injection molding machines 15 forms no part of the present invention.

The platform 16 which supports the molding machines 15, is supported for longitudinal or axial movement of the machines 15 by parallel spaced tracks 24 which are mounted on a bed member 26 of a carriage 28. The carriage 28 includes a set of wheels 29 which are mounted on an axle 31 and which rest upon a pair of elongated parallel spaced tracks 32 extending along the floor at right angles with respect to the tracks 24 on the carriage bed member 26. A corresponding set of hydraulic motors 34 (FIG. 2) are connected to drive the axles 31 for moving the molding machines 15 laterally as a unit along the tracks 32. A double-acting hydraulic cylinder 36 (FIGS. 1 and 2) provides for moving the platform 16 and the molding machines 15 axially as a unit so that by actuation of the motors 34 and cylinder 36, the molding machines 15 may be sequentially presented as a unit to a plurality of four elongated molds 40 supported by a corresponding plurality of four molding presses 45 arranged in a row extending parallel to the carriage support tracks 32.

In one molding apparatus which has been tested and provided highly desirable results, each of the molds 40 was of substantial size and had a length of approximately 84 inches and a width of approximately 32 inches. As shown in FIG. 7, each of the molds 40 consists of a base or lower mold section 42 which mates with an upper mold section 44 covered by a top mold section 46. The mold sections 42 and 44 cooperate to define a pair of generally parallel cavities 48 which extend longitudinally of the mold 40, as illustrated in FIG. 1. The cavities 48 receive the rubber material ejected from the machines 15 through a set of vertical sprue passages 49 (FIG. 7) which connect with a pair of laterally extending and longitudinally spaced runner passages 52 defined between the upper mold section 44 and top mold section 46. The horizontal runner passages extend to one side edge of the mold 40 and terminate at corresponding seat members 53. In the molding apparatus which was constructed and tested, and for purposes of illustration, each of the cavities 48 was formed to produce an elongated molded rubber part or strip which is adapted for use on an automobile for covering the gap between the front bumper and the body of the vehicle.

Figure 2:
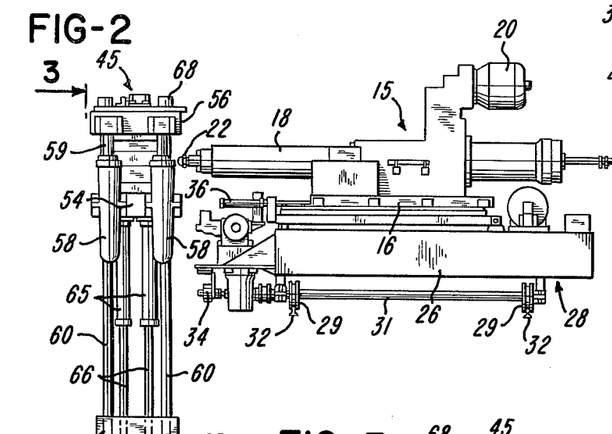
FIG. 2 is a side elevational view of an injection molding machine and one of the hydraulic presses, as taken generally on the line 2—2 of FIG. 1.
Figure 3:
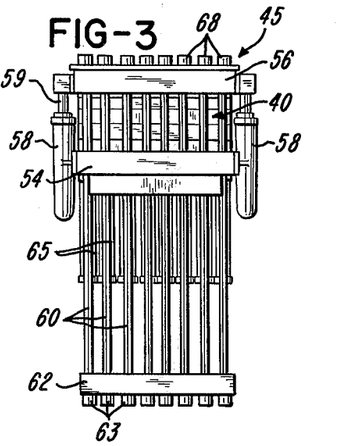
FIG. 3 is an elevational side view of a hydraulic press, as taken generally on the line 3—3 of FIG. 2.
Figure 4:
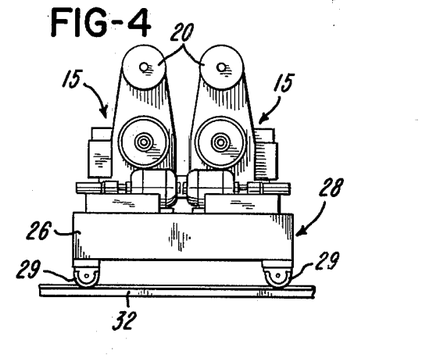
FIG. 4 is an end elevational view of the injection molding machines, as taken generally on the line 4—4 of FIG. 1.

Referring to FIGS. 2 and 3, each of the presses 45 includes a substantially rectangular lower platen 54 and an upper platen 56 which have opposing flat parallel surfaces for supporting the corresponding lower mold section 42 and the top section 46 of the corresponding mold 40. The support for the upper mold section 44 will be described later. Each set of the rectangular platens 54 and 56 are greater in width than the mold 40, as shown by the press at the right in FIG. 1.

Figure 5:
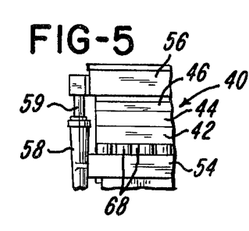
FIG. 5 is a fragmentary elevational view of the hydraulic press shown in FIG. 3, illustrating the press in its closed position and the tie rods in their retracted positions.
Figure 6:
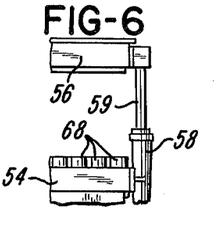
FIG. 6 is a fragmentary view similar to FIG. 5 and showing the press in its open position and the mold removed.

A set of four hydraulic cylinders 58 are mounted on the ends of the lower platen 54 and include corresponding upwardly projecting piston rods 59 which are connected to the upper platen 56. Actuation of the cylinders 58 provides for moving the upper platen 56 between a lower or a closed position (FIGS. 2, 3 and 5) and an elevated or open position (FIG. 6) to effect opening and closing of the sections of the corresponding mold 40.

A set of two parallel rows of vertical tie rods 60 extend through the lower platen 54 along opposite longitudinal sides of the mold 40, and each tie rod 60 is supported for axial vertical movement by a cylindrical bushing (not shown) confined within a corresponding vertical bore formed within the lower platen 54. The lower end portions of the tie rods 60 extend through corresponding vertical bores within a horizontal actuating plate or member 62 and are rigidly secured to the actuating member 62 by corresponding cylindrical nuts 63.

A set of hydraulic cylinders 65 are arranged in two parallel rows (FIG. 2) between the tie rods 60, and the upper end portions of the cylinders 65 project into the lower mold support platen 54 which contains all of the fluid passages for actuating the cylinders 65. Each of the cylinders 65 includes a piston rod 66 which extends downwardly and is rigidly connected to the actuating plate or member 62. As is apparent from FIG. 2, the lower portions of the presses 45 are located within a large pit or recess formed within the floor which supports the tracks 32.

A cylindrical nut 68 is threadably connected to the upper end portion of each of the tie rods 60, and the upper platen 56 is provided with a set of clearance holes or bores (not shown) for receiving the nuts 68 and the corresponding tie rods 60. A substantially flat rectangular latch plate 72 is mounted on the upper surface of the upper platen 56 of each press 45, and a set of keyhole shaped holes or openings 74 are formed within the latch plate 72 in two parallel rows for receiving the corresponding nuts 68 and tie rods 60. The latch plate 72 is supported for lateral sliding movement in response to actuation of a hydraulic cylinder 76. The hydraulic cylinder 76 is mounted on the upper platen 56 within a rectangular opening 77 formed within the center of the latch plate 72 and has a piston rod which is connected to the latch plate. By actuation of the cylinder 76, the latch plate 72 is movable laterally on top of the upper platen 56 between a locked position, as shown by the two middle presses 45 in FIG. 1, and an unlocked or released position, as shown by the press at the left in FIG. 1.

After a mold 40 is moved laterally into the corresponding press 45, as will be explained later, the mold 40 is closed by actuation of the cylinders 58 to retract the piston rods 59 and the upper platen 56 to the positions shown in FIGS. 2 and 3. The cylinders 65 are then actuated to retract the piston rods 66 so that the plate member 62 is elevated and the upper portions of the tie rods 60 are moved upwardly through the corresponding bores within the upper platen 56. The latch plate 72 is then shifted laterally by actuation of the cylinder 76 so that the latch plate 72 moves under the cylinder nuts 68 on the upper ends of the tie rods 60. The cylinders 65 are then actuated in the opposite direction so that the piston rods 66 press downwardly on the plate member 62, thereby clamping or pressing the platens 54 and 56 together along the entire length of the mold 40 positioned between the platens.

While the mold 40 is being clamped between platens 54 and 56, the two injection molding machines 15 are shifted laterally on the tracks 32 to positions where the nozzle members 22 align with corresponding seat members 53 on the mold 40. The molding machines 15 are then shifted axially as a unit towards the mold 40 so that the nozzle members 22 engage the seat members 53. After the rubber material is injected into the mold cavities 48 through the longitudinally spaced sets of passages 49 and 52, the molding machines 15 are retracted by actuation of the cylinder 36 and are then shifted laterally on the tracks 32 to the next adjacent press 45.

After the molded rubber parts within the mold cavities 48 are cured, the hydraulic cylinders 65 are actuated to retract the piston rods 66 and release the clamping force exerted by the tie rods 60. The latch plate 72 is then shifted laterally to its released position, and the tie rods 60 are retracted downwardly to their retracted positions (FIG. 5) by extension of the piston rods 66 of the cylinders 65. The mold 40 is then moved to an open position of the press (FIG. 6) by actuating the cylinders 58 to elevate the upper platen 56 and thereby elevate the mold sections 44 and 46 relative to the lower mold section 42.

Figure 8:
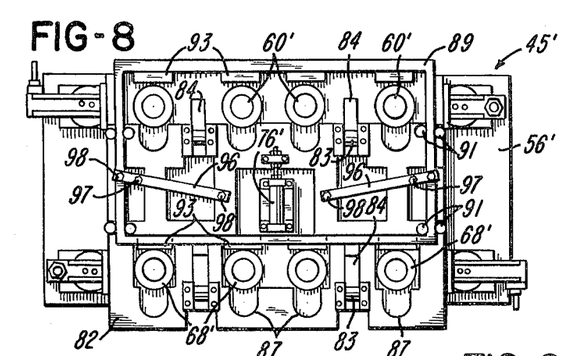
FIG. 8 is a top view of a hydraulic press constructed in accordance with a modification of the invention and illustrating a modified tie bolt latching mechanism in its released position.
Figure 9:
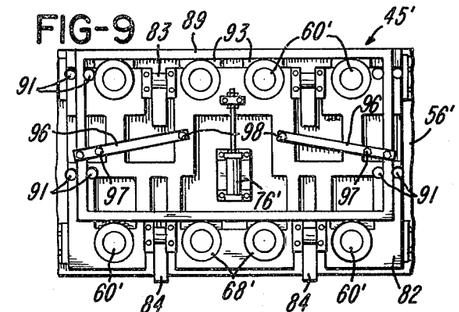
FIG. 9 is a fragmentary view similar to FIG. 8 and showing the latching mechanism in its latched or locked position.

FIGS. 8 and 9 show a modified latching mechanism for locking the upper platen 56 to a set of eight tie rods 60' which project upwardly through corresponding bores within the upper platen 56' of a press 45'. In this embodiment, a generally rectangular latch plate 82 is supported for lateral movement adjacent the top surface of the upper platen 56' by a set of rollers 83 which engage a corresponding set of flat horizontal tracks 84. The plate 82 includes a set of eight U-shaped notches or openings 87 for receiving the upper end portions of the tie bolts 60' directly under the cylindricl nuts 68'. The latching mechanism for the tie bolts 60' also includes a rectangular frame 89 which is supported for lateral movement relative to the latch plate 82 by a set of rollers 91 mounted on the latch plate 82. The frame 89 carries a set of latch pads or bars 93 which oppose the corresponding set of U-shaped openings 87 on the opposite side of the tie rods 60'.

A pair of lever arms 96 are pivotally supported by corresponding studs 97 which are secured to the upper platen 56', and a set of bolts 98 connect the opposite ends of each lever arm 96 to the latch plate 82 and the latch frame 89. Thus when the latch plate 83 is shifted laterally from its released position (FIG. 8) to its locked position (FIG. 9) by actuation of the hydraulic cylinder 76', the latch frame 89 and the latch bars 93 automatically move from their released positions (FIG. 8) to corresponding latched positions (FIG. 9) so that the nut 68' on each tie rod 60' is backed up or supported substantially around its entire periphery. The latching mechanism or system shown in FIGS. 8 and 9 is particularly desirable on a press wherein the tension force on each tie rod is many tons resulting in an extremely high shearing force between each of the tie rods and the nut mounted on the upper end of the tie rod.

Figure 10:
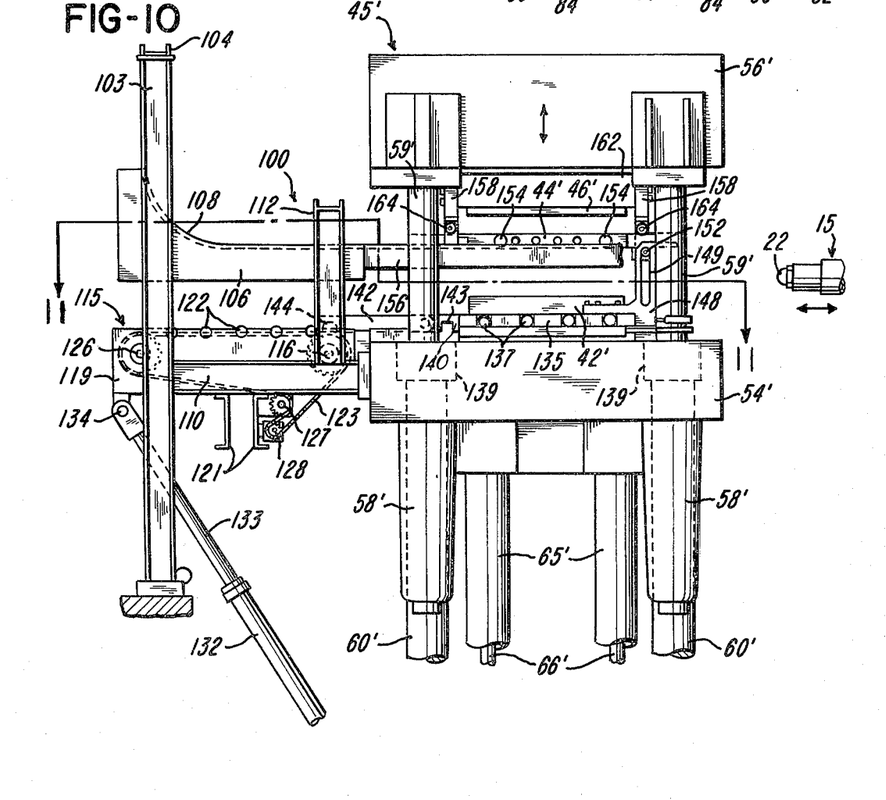
FIG. 10 is a fragmentary elevational end view of a press shown in FIGS. 8 and 9 and illustrating its relation to a corresponding mechanism for automatically transferring mold sections laterally into and out of the press.
Figure 11:
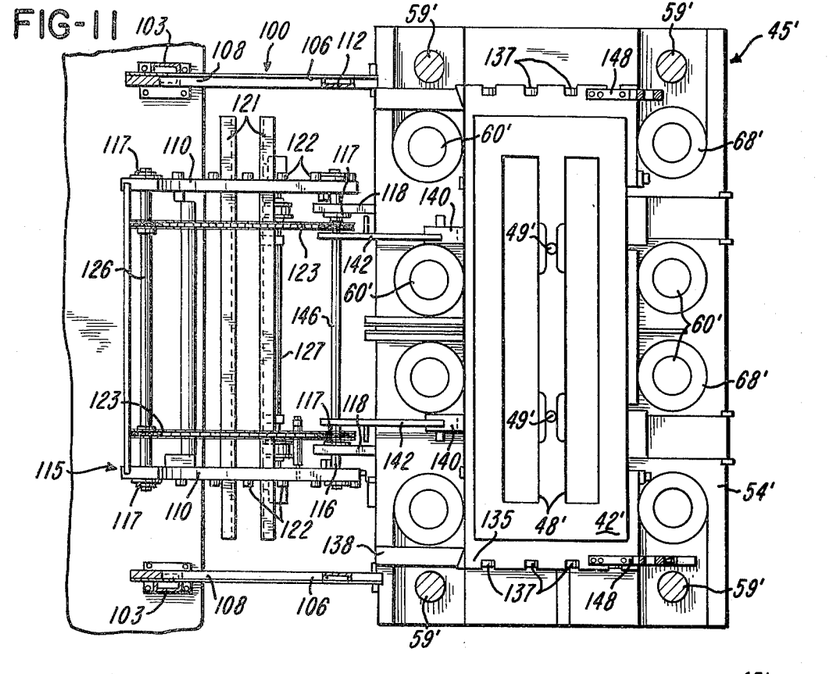
FIG. 11 is a horizontal section taken generally on the line 11—11 of FIG. 10.
Figure 12:
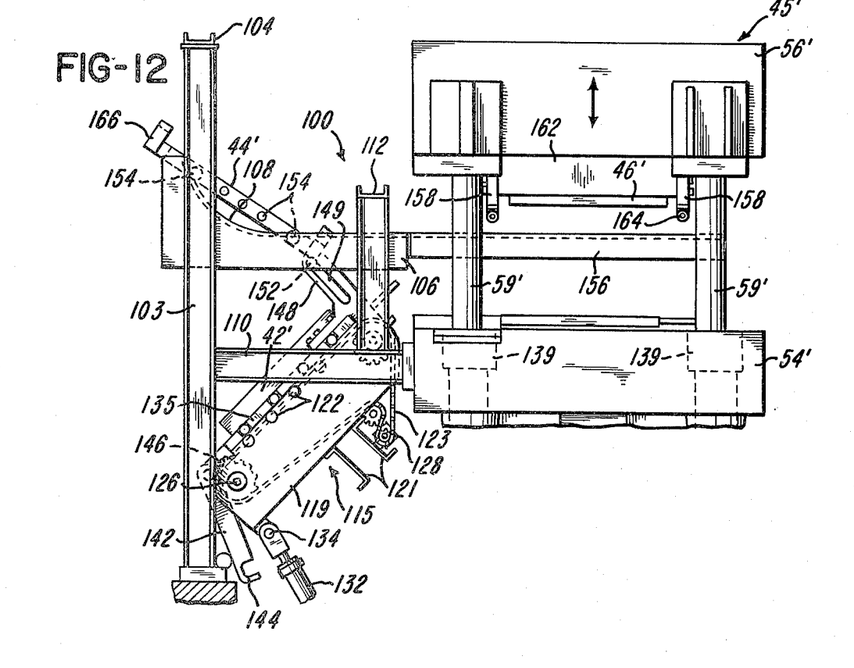
FIG. 12 is a fragmentary elevational view similar to FIG. 10 and showing a set of mold sections removed from the press and positioned for removal of the molded parts.

Referring to FIGS. 10–12, a mold transfer mechanism 100 is erected adjacent each press 45' on the side opposite to the side which is adjacent the injection molding machines 15. Each of the transfer mechanisms 100 provides for transferring the sections 42' and 44' of the corresponding mold 40' between positions within the press 45' and laterally spaced positions where the molded parts may be conveniently removed. Each mechanism includes an inverted U-shaped frame formed by a pair of vertical columns 103 having lower ends secured to a foundation and upper ends rigidly connected by a cross frame member 104. The frame supports a set of parallel spaced tracks 106 each of which includes an upwardly curving track portion 108 secured to the adjacent upright frame members 103. A pair of parallel spaced horizontal frame members 110 extend from the lower platen 54' to the vertical frame members 103 and are also rigidly connected by an inverted U-shaped frame member 112.

A mold support table assembly 115 is positioned between the horizontal frame members 110 and is pivotally supported by a cross-shaft 116 (FIGS. 11 and 12) which extends through a set of bearings 117 mounted on corresponding brackets 118 secured to the lower platen 54'. The table assembly 115 includes a pair of parallel spaced side plates 119 which are rigidly connected by a pair of parallel spaced cross-channel members 121. A set of rollers 122 are supported by the upper edge portions of the side plates 119.

A pair of endless conveyor chains 123 are positioned between the side plates 119 and extend around corresponding sprockets mounted on the shaft 116 and on a cross-shaft 126 supported adjacent the outer edges of the side plates 119 by corresponding bearings 117. The chains 123 also extend around sprockets mounted on a cross-shaft 127 and around corresponding sprockets mounted on the output shafts of a set of reversible hydraulic motors 128 mounted on one of the channel members 121. The table assembly 115 is movable between a horizontal position (FIG. 10) and a downwardly sloping position (FIG. 12) in response to actuation of a pivotally supported hydraulic cylinder 132 having a piston rod 133 connected to one of the side plates 119 by a pivot pin 134.

As shown in FIGS. 10 and 11, the lower mold section 42' is supported by a slightly larger rectangular platform 135 which has notches in its opposite end surfaces for receiving a corresponding set of rollers 137. The rollers 137 engage a set of flat tracks 138 on the lower platen 54' and provide for moving the platform 135 and lower mold section 42' laterally relative to the lower platen 54' when the tie rods 60' are retracted downwardly into corresponding vertical counter bores 139 formed within the lower platen 54'.

A pair of brackets 140 (FIGS. 10 and 11) are mounted on a longitudinal edge of the platform 135 and pivotally support a corresponding pair of arms 142. A downwardly facing U-shaped notch 143 (FIG. 10) is formed within each of the brackets 140, and a similar notch 144 (FIG. 12) is formed within the outer end portion of each arm 142. A set of parallel cross-rods 146 (FIGS. 11 and 12) are secured to the conveyor chains 123 and are adapted to receive sequentially the notches 143 and 144 in an alternating manner, when the chains are driven by the reversible motors 128, as will be explained later.

A pair of upwardly projecting brackets 148 (FIG. 10) are secured to opposite corner portions of the platform 135, and each bracket includes a vertical slot 149. A pair of rollers 152 are mounted on the corresponding corner portions of the upper mold section 44' and project outwardly into the slots 149 within the brackets 148. A set of rollers 154 (FIG. 10) are mounted on each end of the upper mold section 44' and engage corresponding horizontal tracks 156 each mounted within recesses on the adjacent pair of piston rods 59 of the hydraulic cylinders 58'. A set of brackets 158 depend from the center of a rectangular plate 162 secured to the lower surface of the upper platen 56' and support a set of rollers 164 which are positioned to engage a corresponding set of brackets 166 projecting upwardly from the center of the upper mold section 44'. The top mold section 46' is secured to the lower surface of the plate 162.

When the press 45' moves from its closed position (not shown) to its open position (FIG. 10), the top mold section 46' rises directly with the upper platen 56'. The upward movement of the tracks 156 with the piston rods 59' elevates the upper mold section 44' to a position where the tracks 156 are level with the tracks 106. After the tie rods 60' are retracted, the two hydraulic motors 128 are energized in a direction to cause the platform 135 and the lower mold section 42' to be pulled laterally outwardly through the vertical paths of one row of tie rods 60' and onto the rollers 122 of the table assembly 115. As a result of the connection of the upper mold section 44' to the lower mold section 42' through the brackets 148 and the rollers 149, the upper mold section 44' moves laterally outwardly with the lower mold section 42' and onto the stationary tracks 106.

After the platform 135 and the lower mold section 42' are positioned on the rollers 122 of the table assembly 115, the hydraulic motors 128 are stopped, and the hydraulic cylinder 132 is actuated to retract its piston rod 133 and tilt the table assembly 115 on the axis of the shaft 116 to a downwardly sloping position as shown in FIG. 12. The tilting of the brackets 148 causes a simultaneous outward movement of the upper mold section 44' along the upwardly curved track portions 108 so that the upper mold section 44' moves to an upwardly sloping position as also shown in FIG. 12. These positions of the lower mold section 42' and the upper mold section 44' provide for convenient removal of the molded rubber parts within the cavities 48 of the lower mold section 42' and also for removal of any sprues which might remain in the sprue passages 49 within the upper mold section 44'.

When the parts and sprues are removed, the hydraulic cylinder 132 is actuated to return the table assembly 115 to its horizontal position, after which the motors 128 are actuated in a reverse direction to retun the lower mold section 42' and the upper mold section 44' back into the open press, as shown in FIG. 10. The upper platen 56' is then lowered by actuation of the cylinders 58', and the mold sections 42', 44' and 46' are returned to their closed positions. The tie rods 60' are then elevated by actuation of the hydraulic cylinder 65', and the upper end portions of the tie rods 60' are locked to the upper platen 56' by the lateral shifting of the latch plate 82 and the latch frame 89. The cycle is then repeated for producing another set of rubber parts within the cavities 48. While the molded rubber parts are being cured and removed from the mold 40' associated within one of the presses 45', the injection molding machines 15 are shifted laterally on the tracks 32 to another press 45', as described above in connection with FIG. 1, to obtain the maximum efficiency of operation of the molding apparatus and to obtain a maximum production of molded rubber parts.

From the drawings and the above description, it is apparent that an injection molding system apparatus constructed in accordance with the present invention provides a number of desirable features and advantages. For example, the apparatus is ideally suited for molding large or long rubber parts wherein it is desirable to remove the mold from each press after the injected rubber material has been cured within the mold so that the parts may be conveniently removed from the mold cavities. The arrangement of the tie rods 60 or 60' at longitudinally spaced intervals along the mold within each press, provides for clamping the mold sections together with substantial force which is uniformly distributed along the length of the mold. As a result, the mold sections and the upper and lower platens of each press may be more economically constructed with less mass.

Another important feature is provided by the latching mechanism for locking the tie rods 60 or 60' to the upper platen 56 or 56', respectively, and by the means of retracting the tie rods downwardly relative to the lower platen after the tie rods are released from the upper platen. This mechanism provides for quickly removing a mold laterally from the press after the molding operation so that the parts may be quickly and conveniently removed from the mold and for quickly returning the mold back into the press. This feature is especially desirable when the molds have substantial length, such as, for example, the mold 40 which has a length of seven feet.

The side-by-side arrangement of the two injection molding machines 15 on the platform 16 mounted on the carriage 28, also provides for a desirable feature. That is, the carriage 28 and the tracks 32 provide for quickly positioning the two machines 15 to each of the vertical presses 45 or 45', and the movable platform 16 provides for quickly bringing both of the machines 15 into engagement with the mold 40 within each of the presses 45 so that the corresponding mold cavities 48 are rapidly filled with the rubber material ejected simultaneously from the machines 15.

As mentioned above, the mechanism shown in FIGS. 10–12 provides the additional advantages of quickly removing a mold laterally from each of the presses after the molding operation and for automatically opening the mold sections to the positions as shown in FIG. 12 for conveniently removing the molded parts from the mold cavities. This mechanism is especially desirable for large molds having substantial length and width. That is, the operator of the presses may conveniently remove the molded rubber parts from the mold cavities while the mold sections are tilted to the positions shown in FIG. 12 where the cavities are generally facing the operator.

While the forms of molding apparatus herein described constitute preferred embodiments of the invention, it is to be understood that the invention is not limited to these precise forms of apparatus, and that changes may be made therein without departing from the scope and spirit of the invention as defined in the appended claims.

The invention having thus been described, the following is claimed:

1. In apparatus for injecting a material into a mold cavity defined between a set of upper and lower mold sections, and including a vertical press having a set of upper and lower mold support platens with substantially parallel surfaces for supporting the corresponding mold sections therebetween, means for moving one of said platens relative to the other said platen for moving said mold sections between open and closed positions, and an injection molding machine positioned for injecting the material into the cavity when the mold sections are in their closed position, the improvement wherein said press comprises a plurality of parallel tie rods extending adjacent the mold sections substantially perpendicular to said surfaces of said platens, said tie rods being movable axially between extended and retracted positions relative to said platens, hydraulic actuated means connected to one of said platens for moving said tie rods axially, latch means for releasably connecting said tie rods to the other said platen when said tie rods are in said extended position, said hydraulic actuated means and said tie rods in said extended positions being effective to clamp said platens together with a substantial force distributed along the mold sections, said tie rods in said retracted positions providing for removing at least one of the mold sections through the paths of said tie rods, power operated means for moving the mold sections generally horizontally between a molding station between said platens and a part removal station when said platens are in said open positions and said tie rods are in said retracted positions, and means for automatically tilting the upper mold section upwardly and for tilting the lower mold section downwardly at the part removal station to facilitate convenient removing of the molded part from the mold cavity.

2. In apparatus for injecting a material into a mold cavity defined between a set of mold sections having a substantial length, and including a press having a set of mold support platens with substantially parallel surfaces for supporting the mold sections therebetween, means for moving one of said platens relative to the other said platen for moving said mold sections between open and closed positions, and an injection molding machine positioned for injecting the material into the cavity when the mold sections are in their closed position, the improvement wherein said press comprises a plurality of parallel tie rods extending adjacent the mold sections substantially perpendicular to said surfaces of said platens, the spacing between adjacent said tie rods being substantially less than the length of the mold sections, means on one of said platens for supporting said tie rods for axial movement between extended and retracted positions relative to said platens, hydraulic actuated means secured to said one platen and connected to said tie rods for rapidly moving said tie rods between said retracted and extended positions, latch means for releasably connecting said tie rods to the other said platen when said tie rods are in said extended position, said hydraulic actuated means and said tie rods in said extended positions being effective to clamp said platens together with a substantial force distributed along the length of the mold sections, and said tie rods in said retracted positions providing for removal at least one of the mold sections through the paths of said tie rods after each molding operation.

3. Apparatus as defined in claim 2 including means defining a corresponding plurality of openings within said other mold platen for receiving said tie rods, and said latch means comprises a linearly movable latch plate effective to latch and release said tie rods substantially simultaneously relative to said other mold platen.

4. Apparatus as defined in claim 2 including means forming a generally radial shoulder on each of said tie rods, said latch means comprise an elongated latch plate extending substantially normally to said rods and having means for engaging each said shoulder, and means for moving said latch plate laterally and linearly relative to said tie rods to effect locking and releasing of said rods.

5. Apparatus as defined in claim 4 wherein each of said shoulders is annular, said latch plate includes means forming a U-shaped seat for engaging a portion of each said shoulder, and means movable with said latch plate for engaging the remaining portion of each said shoulder.

6. Apparatus as defined in claim 4 wherein said latch plate defines a U-shaped opening for each of said tie rods, and fluid cylinder means connecting said latch plate to the adjacent said platen for moving said latch plate.

7. Apparatus as defined in claim 2 wherein the mold sections define a set of runner passages extending to the mold cavity, a plurality of said injection molding machines arranged in side-by-side relation, a carriage supporting said injection molding machines for simultaneously horizontal linear movement as a unit in a first direction between a retracted position and elongated injecting position engaging the mold, and elongated track means supporting said carriage and said molding machines for horizontal linear movement as a unit in a second direction substantially perpendicular to said first direction.

8. Apparatus as defined in claim 7 wherein said mold platens are elongated and generally rectangular in configuration for receiving an elongated mold, said molding machines are spaced longitudinally relative to said platens, and said track means extend in a longitudinal direction relative to said platens.

9. Apparatus as defined in claim 2 wherein said mold platens are elongated and generally rectangular in configuration for receiving an elongated mold, and at least three said tie rods are disposed in at least one row extending longitudinally of said mold platens adjacent the mold.

10. Apparatus as defined in claim 9 wherein said tie rods are disposed in two substantially parallel rows extending longitudinally of said mold platens on opposite sides of the mold.

11. Apparatus as defined in claim 2 wherein said press is vertical and the mold includes upper and lower mold sections, and including power operated means for moving the mold sections generally horizontally between a molding station between said platens and a part removal station when said platens are in said open positions and said tie rods are in said retracted positions.

12. Apparatus as defined in claim 11 wherein said means for moving the mold sections include at least one endless chain, a motor for driving said chain, and means for connecting at least one of said mold sections to said chain.

13. Apparatus as defined in claim 11 including means for automatically tilting the upper mold section upwardly and for tilting the lower mold section downwardly at the part removal station to facilitate convenient removing of the molded part from the mold cavity.

14. Apparatus as defined in claim 13 wherein said means for tilting the lower mold section include a pivotally supported table assembly positioned to receive the lower mold section, and said means for tilting the upper mold section include a curved track, and means responsive to pivoting of said table assembly and the lower mold section for moving the upper mold section along said curved track.

15. Apparatus as defined in claim 2 including a plurality of vertical said presses arranged in a horizontal row, a plurality of said injection molding machines arranged in horizontally spaced side-by-side relation, means including a carriage for supporting said injection molding machines for horizontal linear movement in a first direction perpendicular to said row of presses, and elongated track means supporting said carriage for horizontal linear movement of said machines in a second direction parallel to said row of presses.

16. Apparatus as defined in claim 2 wherein said mold support platens includes a stationary lower platen and an upper platen supported for vertical movement, hydraulic cylinder means mounted on said lower platen and connected to move said upper platen, said tie rods are supported by said lower platen for vertical movement on their respective axes, said latch means is mounted on said upper platen, a plurality of hydraulic cylinders mounted on said lower platen and projecting downwardly therefrom, said hydraulic cylinders including downwardly projecting corresponding piston rods, and means for rigidly connecting said piston rods to the lower end portion of said tie rods to effect vertical movement of said tie rods as a unit in response to actuation of said hydraulic cylinders.

17. Apparatus as defined in claim 16 wherein said hydraulic cylinders are simultaneously supplied with hydraulic fluid through passages formed in said lower platen.

18. Apparatus for injecting a material into a mold cavity defined between a set of mold sections, comprising a vertical press having an upper platen and a lower platen for supporting the mold sections, means for moving said upper platen vertically relative to said lower platen for moving said mold sections between open and closed positions, an injection molding machine positioned for injecting the material into the cavity when the mold sections are in their closed position, a plurality of parallel vertical elongated tie rods arranged in a row and extending adjacent the mold sections, said tie rods being supported by said lower platen for vertical movement between upwardly extended positions and lower retracted positions relative to said platens, hydraulic cylinder means connected to said lower platen, means for connecting said cylinder means to said tie rods for moving said tie rods axially as a unit, latch means supported by said upper platen for releasably connecting said tie rods to said upper platen when said tie rods are in said extended positions, said tie rods in said extended positions being effective to clamp said platens together with a substantial force distributed along the mold sections in response to actuation of said hydraulic cylinder means, and said tie rods in said retracted positions providing for removing at least one of the mold sections horizontally through the paths of said tie rods.

19. Apparatus as defined in claim 18 including a plurality of said presses arranged in a horizontally extending row, means supporting said injection molding machine for lateral horizontal movement in a first direction parallel to said row of presses, and means supporting said machine for horizontal movement in a second direction perpendicular to said first direction to present said machine to the mold within each press.

20. Apparatus for injecting a material into a mold cavity defined between a set of mold sections, comprising a vertical press having an upper platen and a lower platen for supporting the mold sections, means for moving said upper platen vertically relative to said lower platen for moving said mold sections between open and closed positions, an injection molding machine positioned on one side of said press for injecting the material into the cavity when the mold sections are in their closed positions, a plurality of parallel vertical elongated tie rods arranged in a row and extending adjacent the mold sections, said tie rods being supported by said lower platen for vertical movement between upwardly extended positions and lower retracted positions relative to said platens, hydraulic cylinder means connected to said lower platen, means for connecting said cylinder means to said tie rods for moving said tie rods axially as a unit, latch means supported by said upper platen for releasably connecting said tie rods to said upper platen when said tie rods are in said extended position, said tie rods being effective to clamp said platens together with a substantial force distributed along the mold sections in response to actuation of said hydraulic cylinder means, said tie rods in said retracted positions providing for removing at least one of the mold sections horizontally from said press through the paths of said tie rods, and a mold transfer mechanism positioned on the opposite side of said press and having power operated means for moving said one mold section to a laterally spaced position to facilitate removing a molded part from the cavity.

21. Apparatus for injecting a material into a plurality of mold cavities defined between corresponding sets of mold sections each having a predetermined length, comprising a plurality of presses arranged in a row, each press having a set of mold support platens with substantially parallel surfaces for supporting the mold sections therebetween, means for moving one of said platens relative to the other said platen for moving said mold sections between open and closed positions, a plurality of injection molding machines positioned for injecting the material into the cavities when the corresponding mold sections are in their closed position, each said press including a plurality of parallel tie rods extending adjacent the corresponding mold sections substantially perpendicular to said surfaces of said platens, the spacing between adjacent said tie rods being substantially less than the length of the mold sections, means on one of said platens for supporting said tie rods for axial movement between extended and retracted positions relative to said platens, hydraulic actuated means secured to said one platen and connected to said tie rods for rapidly moving said tie rods between said retracted and extended positions, latch means for releasably connecting said tie rods to the other said platen when said tie rods are in said extended position, said hydraulic actuated means and said tie rods in said extended positions being effective to clamp said platens together with a substantial force distributed along the length of the mold sections, said tie rods in said retracted positions providing for removing at least one of the mold sections through the paths of said tie rods after each molding operation, a carriage supporting said injection molding machines, and track means supporting said carriage for movement of said presses as a unit generally parallel to said row of presses.

22. Apparatus as defined in claim 21 wherein said carriage and said injection molding machines are supported by said track means on one side of said row of presses, and at least one mold transfer mechanism is positioned on the opposite side of said row of presses for quickly transferring at least one mold section from each said press after a molding operation between a molding position within said press and a position spaced laterally from said press to facilitate convenient removal of a molded part from the mold section.

23. Apparatus for injecting a material into a mold cavity defined between a set of mold sections, comprising a press having a first platen and a second platen for supporting mold sections of predetermined length, a plurality of hydraulic cylinders secured to said first platen and including a corresponding plurality of parallel piston rods secured to said second platen, means for actuating said cylinders for moving said second platen relative to said first platen for quickly moving said mold sections between open and closed positions, an injection molding machine positioned for injecting the material into the cavity when the mold sections are in their closed position, a plurality of elongated tie rods extending adjacent the mold sections parallel to said piston rods, the spacing between adjacent said tie rods being substantially less than the length of the mold sections, hydraulic cylinder means connected to one of said platens, said tie rods being supported for axial movement between extended positions and retracted positions relative to said one platen, means for connecting said hydraulic cylinder means to said tie rods for moving said tie rods axially as a unit relative to said one platen, latch means supported by the other said platen for releasably connecting said tie rods to said other platen when said tie rods are in said extended positions said tie rods in said extended positions being effective to clamp said platens together with a substantial force distributed along the length of the mold sections in response to actuation of said hydraulic cylinder means and to minimize the thickness of said platens, and said tie rods in said retracted positions providing for removing at least one of the mold sections laterally through the paths of said tie rods.

* * * * *